FIP8106 XR 3,306,977

Feb. ... 3,306,977

...HENOMENA PRODUCED IN AN ULTRASONIC CELL

Filed Dec. 6, 1963 2 Sheets-Sheet 1

SUBSTITUTE FOR MISSING XR

HARRY P. BRUEGGEMANN

INVENTOR

BY R. E. Grangne

ATTORNEY

3306977
OR IN 358/201

HARRY P. BRUEGGEMANN
INVENTOR.

BY R. E. Grainger
ATTORNEY

United States Patent Office 3,306,977

Patented Feb. 28, 1967

3,306,977

LINE SCAN DEVICE UTILIZING CAVITATION PHENOMENA PRODUCED IN AN ULTRASONIC CELL

Harry P. Brueggemann, San Marino, Calif., assignor to The Marquardt Corporation, Van Nuys, Calif., a corporation of California Filed Dec. 6, 1963, Ser. No. 328,708
7 Claims. (Cl. 178—7.6)

This invention relates to apparatus for electro-optical scanning, and more particularly to radiant energy scanning apparatus in which cavitation phenomena produced in an ultrasonic cell are used to horizontally scan an object or scene in order to convert the image thus scanned directly into a video signal.

Various video pickup devices have been constructed heretofore for translating an image into a corresponding electrical (video) signal. High-resolution video display devices and wide-band video amplifiers for use with conventional video pickup devices are within the state-of-the-art. However, conventional video pickup devices such as image orthicon or vidicon tubes are limited in resolution which is typically of the order of 800 lines and is, therefore, inferior to the remaining links in the video transmission system, as regards resolution. The limit of pictorial excellence is, in part, established by scanning standards which define the number of lines into which the image is dissected in the scanning process. The number of lines must be sufficient to provide a fine enough image structure to satisfy the eye under normal viewing conditions. Values of 405, 525, 625, and 819 lines per picture are standardized in various countries. The standard in North America is 525 lines. This number is the total of all the lateral traverses in the scanning pattern from the beginning of one image frame to the beginning of the next image frame. The horizontal resolution generally exceeds the vertical resolution and may be defined in terms of lines even though the traverse is continuous rather than discrete lines as in the vertical scan. The horizontal scanning direction, standardized throughout the world, is from left to right along each line, and the vertical direction is from the top of the image to the bottom of the image.

There is provided by the present invention a high-resolution video pickup device which is fully compatible with the resolution and bandwidth capabilities of the remaining elements in a video transmisison system. For example, in a typical construction, a resolution of 2400 lines may be achieved.

The apparatus of the present invention employs an electro-optical image dissector or line-scaning device which utilizes the principle of cavitation induced in a liquid by ultrasonic sound waves to control the diffraction of a light beam passing therethrough. In a typical construction the apparatus of the invention comprises a transparent, liquid-filled cell, which is ultrasonically excited for horizontally scanning a line element of an image and a photomultiplier tube responsive to the light output from the cell to produce an output video signal of high resolution. The cell or line-scan portion of the device essentially comprises a transparent liquid-filled cell in which hydrodynamic cavitation can be induced in order to establish a sweeping wave pattern of bubbles in the liquid. That is, vertical lines of extremely small bubbles are formed by the cavitation and produce a diffraction grating effect on light rays striking them at the plane or symmetry of the cell. A suitable ancillary optical system is used to image the scene of interest onto the cell. As these vertical lines of bubbles move across the cell in a sweeping motion, the incoming light rays are diffracted in a corresponding sweeping fashion upon interception by the lines of bubbles. Diffracted and undiffracted rays leaving the cell are directed to a Schlieren optical system which blocks the undiffracted rays and allows only the diffracted rays to pass. The diffracted rays are then focused by suitable optical elements onto a photomultiplier tube.

If the light rays passing through the lines of bubbles in the cell comprise a line portion of an optical image focused by the ancillary input optics, the bubbles will then sample a portion of this optical image. Output of light diffracted into the photomultiplier tube is a function only of the amount of light received from the optical image at the location of the lines of bubbles. As a result the optical image is horizontally scanned and the output from the photomultiplier tube is then a video signal derived from the line scan of the optical image. This video signal is identical to the video signal produced by a conventional video pickup tube, with the exception that the signal thus produced has a considerably higher resolution and a lower noise level than video signals derived from either a conventional vidicon or an image orthicon tube.

The photomultiplier tube used to detect the diffracted light from the cell is an inherently low-noise level device because thermal noise is nearly absent, with only shot noise present. The conventional image orthicon tube uses a photomultiplier type of current amplifier, however, it amplifies the current from a noisy scanning beam. In the present invention, however, the photomultiplier amplifies the current from a photoemitting surface, which is much lower in noise content than the conventional scanning beam of the image orthicon. The inherent simplicity of the apparatus of the invention, as compared with conventional video pickup devices is a distinct advantage in addition to the improved resolution attainable therefrom.

It is therefore a principal object of the invention to provide novel and improved means for scanning an image or a scene and providing a corresponding video output signal.

Another object of the invention is to provide novel and improved means for image dissection.

An object of the invention is to provide novel and improved means for electro-optical scanning, corresponding to the horizontal output from a conventional television camera.

Still another object of the invention is to provide novel and improved ultrasonic light cell scanning apparatus.

Yet another object of the invention is to provide light scanning apparatus employing cavitation phenomena to control diffraction of light into a photoelectric transducer.

It is another object of the invention to provide novel and improved radiant energy scanning means which employs a plurality of lines of microscopic bubbles to cause diffraction of the radiant energy passing therethrough.

Another object of the invention is to provide improved video pickup apparatus having higher resolution than obtainable from prior video pickup devices.

Still another object of the invention is to provide video pickup means employing ultrasonic energy to dissect an image.

Another object of the invention is the improvement of video scanning apparatus, generally.

A general object of the invention is to provide novel and improved radiant energy scanning apparatus which overcomes disadvantages of previous means and methods heretofore intended to accomplish generally similar purposes.

Many other advantages, features and additional objects of the line scan device of the present invention will become manifest to those versed in the art upon making reference to the detailed description and the accompanying sheets of drawings in which a preferred structural embodiment, incorporating the principles of the present invention is shown by way of the illustrative example. In the drawings.

As stated hereinabove the invention is, in essence, a device for scanning a line element of an optically focused image, and producing an output video signal of high-resolution therefrom. In a preferred embodiment, the line element comprises a horizontal line of an image to be televised. Vertical scanning of an image to be televised in accordance with conventional television standards occurs at a substantially lower frequency than does horizontal scanning and is, therefore, not as susceptible to image degradation. For this reason, it is contemplated that conventional means may be used to vertically scan the image to provide the horizontal line input to the device described hereinafter as a preferred embodiment. However, the apparatus of the invention is not necessarily so limited, and both horizontal and vertical image dissection may be achieved by means of the method and apparatus of invention, as will appear.

Figure 1:
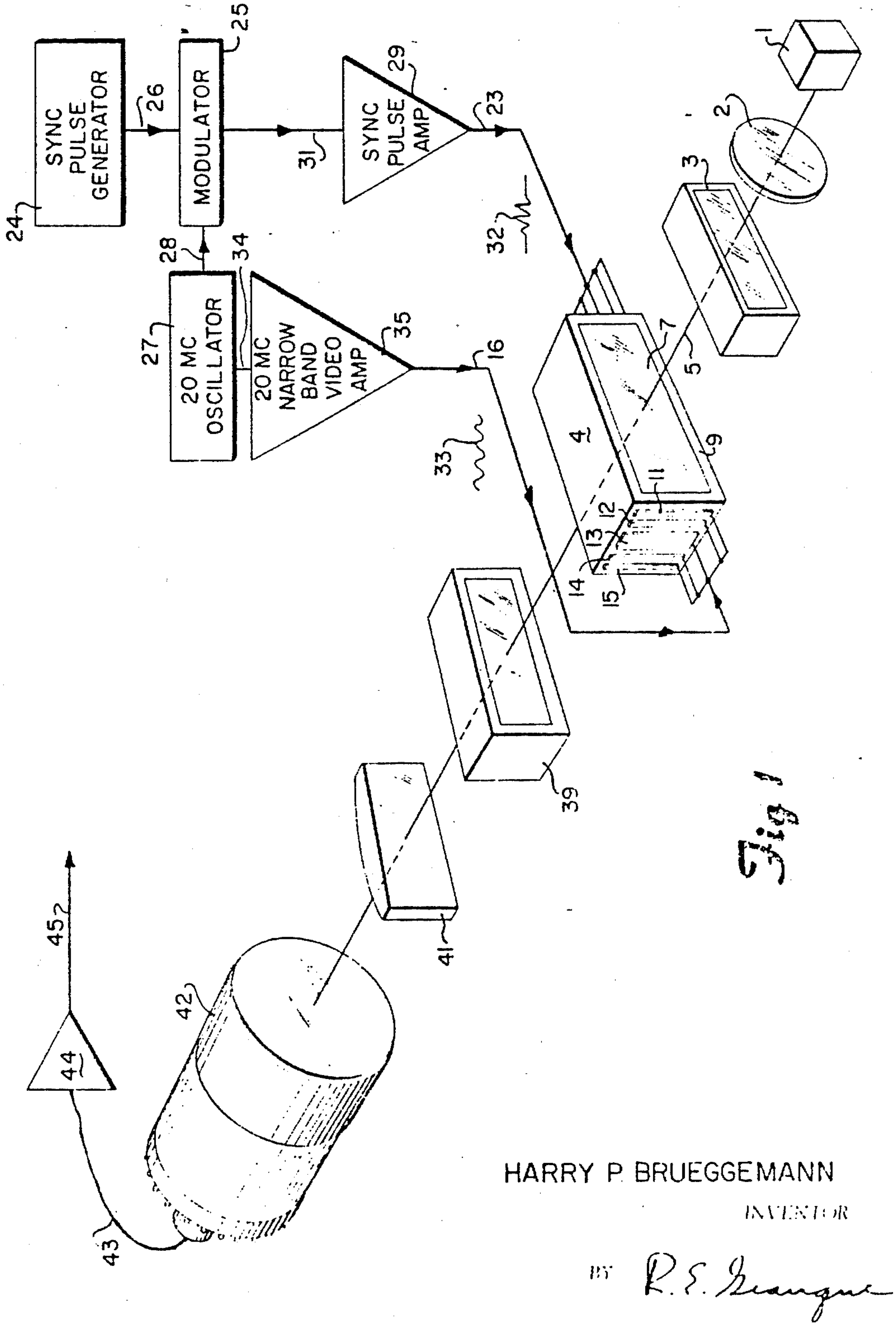
FIGURE 1 is a block diagram, incorporating a somewhat diagrammatic perspective view of the ultrasonic light cell and ancillary optical portion of the apparatus, of a line scan system for generating a high-resolution video output signal.

FIGURE 1 shows a typical system incorporating an ultrasonic light cell modulator according to the invention to provide the horizontal line scan function of a video pickup (television camera) system. As can be seen in FIGURE 1, light from the object 1 to be scanned is collected by objective lens 2 and is transmitted to the vertical sweep equipment 3, which can be of the rotating-mirror type, or a vertical sweep device such as that described in copending application Serial No. 339,521 filed January 21, 1964, and of common assignee herewith. The function of the vertical sweep equipment 3 is to move the optical image, formed by lens 2 in the plane of symmetry of the ultrasonic cell 4, vertically downward. The centerline of the optical system is indicated at 5, and the plane of symmetry of cell 4 is normal thereto, and is indicated at 6 in FIGURE 2. Any means suitable for downwardly shifting the image focused at the plane of symmetry 6 may be employed for the vertical sweep equipment 3. This vertical sweep must be done without the image being deviated from the plane of symmetry and within the region of the ultrasonic cell windows 7 and 8. The rate of the vertical sweep preferably conforms to that commonly used in conventional television systems such as 30 frames per second in North America, or 25 frames per second in Europe.

Figure 2:
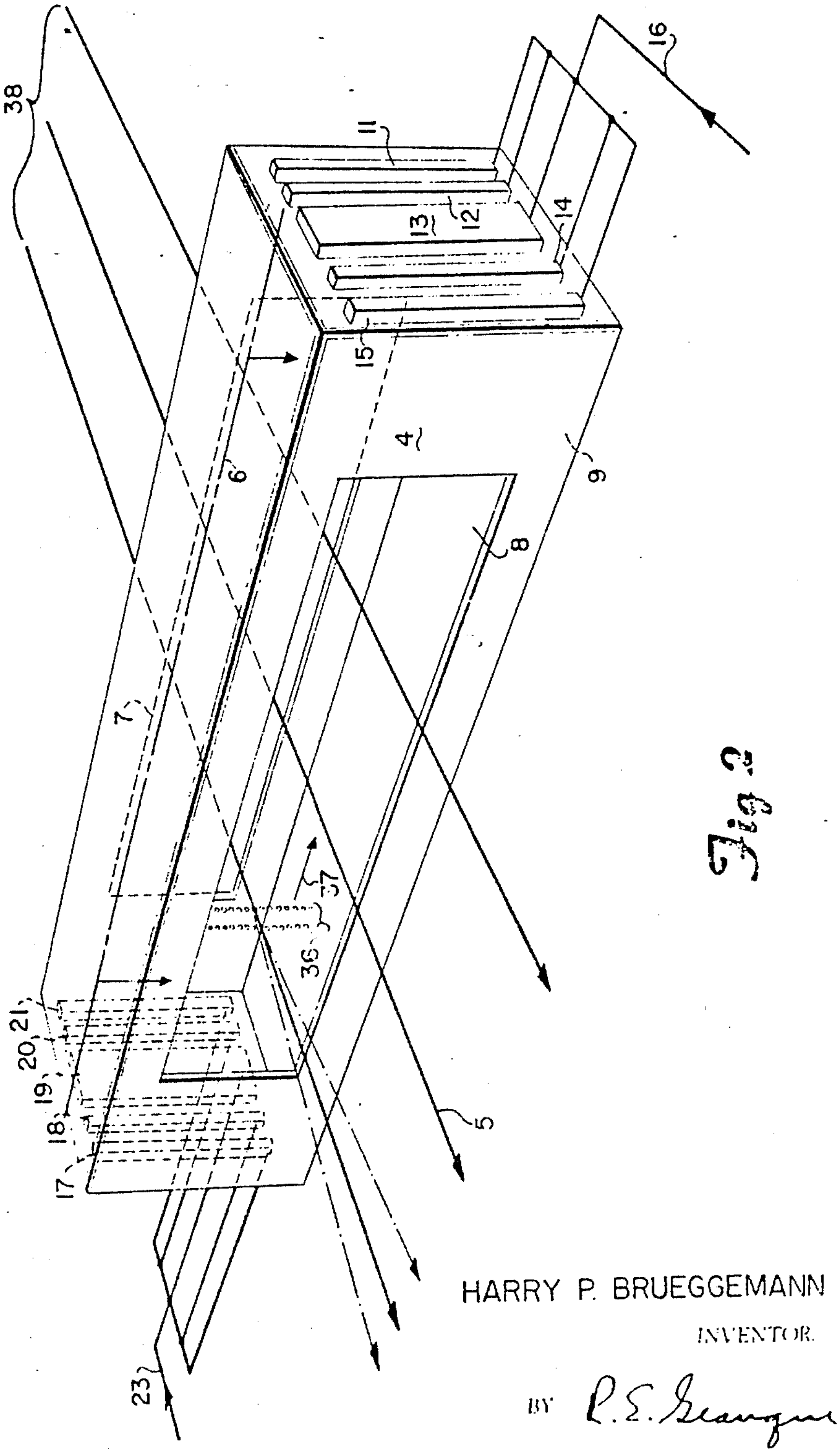
FIGURE 2 is a somewhat diagrammatic perspective view of the ultrasonic light cell portion of the scanning apparatus of the invention.

The ultrasonic light cell 4, receiving the image from the vertical sweep equipment 3, consists essentially of a liquid enclosing container 9 with front and rear transparent windows 7 and 8 as shown in FIGURE 2. With further reference to FIGURE 2, there is sealed within the container 9 a suitable fluid such as water, in which hydrodynamic cavitation can be induced under suitable conditions of imposed high-frequency acoustic energy. On each end of the container 9 is an array of electro-acoustic transducers, each of which is so arranged as to focus generated ultrasonic wave trains through the water by Fresnel diffraction, and across the cell in opposing directions, within a thin vertical plane previously designated as the plane of symmetry 6. Each transducer may comprise an array of piezoelectric crystals disposed at each end of container 9. The first array comprises crystals 11–15 which are excited in parallel via line 16, and concentrate the ultrasonic energy along the plane of symmetry 6. In addition to concentrating the acoustic energy in a plane, the array of crystals (11–15) can be designed to concentrate the energy so as to compensate for losses of absorption by the liquid as the acoustical energy is propagated through the cell liquid. Also, the array may be arranged to rapidly diffuse the energy at the end of the scan cycle so that together with the absorption of the remaining energy by the end walls of the container 9, only a very small amount of energy will be reflected back into the cell. The second array is similar to the first array and comprises crystals 17–21 which are excited in parallel via line 23.

While the crystal arrays shown have five elements each, the invention need not be so limited. Three elements are considered to constitute the simplest practical array capable of concentrating and focusing the energy. The number and arrangement of the crystals in an array can be determined from the physical parameters of the cell using Cornu's spiral, or Fresnel's integrals in a manner well known to those skilled in the art.

Continuous excitation at ultrasonic frequency is applied to the first array (11–15) via line 16. The second array (17–21) is cyclically or intermittently excited with bursts at ultrasonic frequency. The sources of these excitation signals will now be described.

Referring again to the system illustrated in FIGURE 1, a pulse from the sync pulse generator 24 is fed to the modulator 25 via line 26, which allows a 20 megacycle (mc.) wave burst to pass from the 20 megacycle oscillator 27 via line 28 to the sync pulse amplifier 29 via line 31. The output from the sync pulse amplifier 29 comprises a 20 mc. burst as indicated at 32, and is applied to the multicrystal array 17–21 via line 23.

A 20 megacycle continuous wave (indicated at 33) is also supplied by the oscillator 27, via line 34, to the input of the 20 megacycle narrow-band video amplifier 35. This amplifier (35) output then is supplied via line 16 to multicrystal array 11–15 which generates, along the plane of symmetry 6, a continuous ultrasonic waveform moving to the left (as viewed in FIGURE 2) and having an amplitude just below the cavitation level of the liquid in the cell 4. The excitation of multicrystal array 17–21 by sync pulse amplifier 29 generates, also along the plane of symmetry 6, an ultrasonic waveform of the same carrier frequency (20 mc.) moving to the right and with peak amplitudes just below the cavitation level of the cell liquid. When the two opposing waveforms meet, their amplitudes are additive to produce a standing wave with an amplitude sufficient to cause hydrodynamic cavitation of the cell liquid. As a result of the induced cavitation, within the plane of symmetry 6, vertical lines of bubbles are formed as shown at 36 in FIGURE 2.

It is not necessary to maintain the cavitation bubbles after formation, and they are allowed to collapse after every half-cycle of the ultrasound. Therefore, cavitation bubbles appear at any one instant of time only at the point where the ultrasonic burst energy (viz. the energy from array 17–21) happens to be. Since new bubbles are being formed at every half cycle, the lines of bubbles appear to move along with the burst, and the formed bubble lines (e.g. 36) continue to move on across the cell 4, within the plane of symmetry 6, in the direction indicated by arrow 37. The envelope of burst wave sent to multicrystal array 17–21 is kept sufficiently short that upon meeting the opposite moving continuous wave from array 11–15, only a very few lines of cavitation bubbles are formed at any one instant. The energy of each of the two colliding waves is balanced such that the resulting cavitation energy is maintained constant over the operating length of the cell 4. Thus the bubbles produced are always the same size and quantity whether they are formed near the first array 11–15 or the second array 17–21.

The cavitation energy is maintained constant by interference focusing.

The bubbles (36) resulting from induced cavitation are formed and collapsed within one-half cycle of the imposed ultrasonic wave frequency. Since two vertical lines of bubbles of extremely small diameter are formed, they produce a diffraction grating effect on the light rays striking them in the cell at the plane of symmetry 6. As these vertical lines of bubbles move across the cell, the incoming light rays are diffracted in a sweeping fashion upon interception as shown in FIGURE 2. The amount of light diffracted depends on the amount of light in the incoming bundle of rays 38 at that point, since the multicrystal arrays (11–15 and 17–21) are designed to maintain the lines of bubbles constant in number and amplitude as they move across the cell.

Since cell 4 will only scan a single line, in this case a horizontal line, of the image, vertical scanning is obtained by ancillary apparatus (e.g. 3) as discussed hereinabove which will slowly move the image vertically across the centerline of the entrance window 7 of cell 4 and may comprise a rotating mirror or a device of the type described in the above-mentioned copending application Serial No. 339,521.

As shown in FIGURE 1, the diffracted and undiffracted rays leaving the cell are directed to a schlieren optical system 39 which blocks out the undiffracted rays, and allows only the diffracted rays to pass on. As is well known to those versed in the art, a schlieren optical system may be used to make visible, changes in optical parameters of a transparent material which produce anomalous changes in the direction of propagation of a light ray. The schlieren design used in this invention operates on the fact that the change in direction of the light rays in the plane of symmetry 6 are discrete changes, not gradual changes as would be encountered in light passing through air of gradually changing density. The light rays passing through the plane of symmetry 6 are either undiffracted or diffracted through a specific angle given approximately (for small angles) by:

$$\alpha = n\lambda_L/\lambda_S$$

where $n$ is an integer representing the spectral order, $\lambda_L$ is the wavelength of the light diffracted, and $\lambda_S$ is the spacing between the lines of the diffraction grating (the lines of bubbles in this case, or one-half the wavelength of the ultrasound in the liquid).

The optical system images the light source at some point after the light passes through the cell 4. The cell 4 is located at an aperture of this image, and the image of the light source is an aperture for the image of the plane of symmetry 6. Thus at the plane of the image of the light source, there will be a multiplicity of images, one for each spectral order of the diffracted light including the zero order (undiffracted light). It follows then that if an opaque material is located in this image plane so so to cover the image of the zero order spectrum, but not the other orders, then the undiffracted light will be eliminated while the diffracted light passes on and illuminates the screen. Refined schlieren optical systems employing multiple slots or focusing are well known to those versed in the art, and the above brief description is considered sufficient for a complete understanding of the invention.

The diffracted rays from the schlieren optical system 39 are focused by an auxiliary lens 41 onto the face of photomultiplier tube 42. If the light rays passing through the lines of bubbles are a portion of an optical image created by the objective lens 2, the bubbles will then sample a portion of this optical image. The amount of diffracted light entering the photomultiplier tube 42 is a function only of the amount of light received from the optical image at the location of the lines of bubbles in cell 4. Since bubbles exist only at the location of the 20 megacycle burst of ultrasonic energy, and the burst is traveling at the speed of sound in the liquid, the optical image is being scanned horizontally at this speed. The output from the photomultiplier tube 42, appearing on line 43, comprises a video signal derived from the line scan of the optical image, and is identical in form to video signals produced by conventional devices of the prior art. The video signal may be amplified by video amplifier 44 and transmitted to utilization equipment (not shown) via line 45. However, this video output signal has a considerably higher resolution and a lower noise level than the video signals derived from either a conventional vidicon or an image orthicon tube. The resolution, in terms of television lines, is given by the ratio of the length of the cell to one-half of the spacing distance between the two bubble lines. The latter distance is a function of the frequency of the ultrasonic waveform within the cell. Thus, for a cell 1.5 inches long, with an ultrasonic excitation frequency of 50 megacycles, at a water temperature of 74° C., the obtainable resolution is 2400 lines. This is greater than a three-fold increase in optical resolution over the best conventional vidicon. Increasing the length of the cell, and/or raising the frequency of the ultrasound increases the horizontal resolution. The optical efficiency of the line scan device is a function of the diffraction angle in the cell; as this angle increases the optical efficiency increases. This angle increases as the ultrasonic frequency increases; therefore, at high ultrasonic frequencies, the line scan device not only has higher resolution, but higher optical efficiency.

Inasmuch as each of the functional units represented by a block in the block diagram of FIGURE 1 may be any one of the numerous devices for each respective function well known in the art, it is deemed unnecessary to show circuit details. Also, it should be understood that both the size of the bubbles and the spacing between the lines of bubbles, as shown in FIGURE 2, have been greatly exaggerated for illustrative purposes.

Since certain changes may be made in the above described line scan device without departing from the scope of the invention herein involved, it is intended that all matter contained in the above description or shown in the accompanying drawings shall be interpreted as illustrative and not in a limiting sense. For example, the embodiment described may be modified to enhance the efficiency of the cavitation process.

It is relatively difficult to induce cavitation in pure degassed water under conditions of high intensity sound. This is due primarily to the surface tension of the water which can sustain very large negative pressures in the body of the liquid. This internal cohesive force can be overcome by disbursing microscopic nuclei such as polystyrene spheres of approximately 0.1 micron diameter, throughout the liquid. These nuclei must be smaller than a wavelength of light, otherwise, they themselves will scatter light and reduce the optical efficiency of the device. The water within the cell may also be charged with a gas, such as carbon dioxide, which has a high vapor pressure at the operating temperature of the cell. This gas will diffuse into each bubble as it starts to grow from its nucleus, reinforcing its growth rate. Also a suitable agent may be added to the water to reduce its surface tension without wetting the polystyrene spheres (nuclei).

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention; therefore, it is intended that the invention be limited only as indicated by the scope of the following claims.

What is claimed is:

1. A line scan apparatus comprising:

means for projecting a line element of an image along a given path;

a transparent liquid body located transversely of said path;

first means for continuously propagating acoustical energy into one end of said liquid body in a direction transverse to said path, said acoustical energy having an energy level below that capable of producing cavitation in said liquid body; and second means located at the opposite end of said liquid body for cyclically propagating bursts of acoustical energy transversely to said path and in the opposite direction to said continuously propagated acoustical energy, the summation of said continuously propagated and said cyclically propagated energy from said first and second means, respectively, producing cavitation within said body at their meeting points when the summation of said energies equals or exceeds that required for cavitation, the cavitation producing a localized diffraction grating in said body which sweeps transversely across said path.

2. A line scan apparatus as defined in claim 1 wherein said first acoustical energy propagating means comprises:

a first array of piezoelectric transducers arranged to concentrate the acoustical energy output therefrom in a plane transverse to said path.

3. A line scan apparatus as defined in claim 1 wherein said second acoustical energy propagating means comprises:

a second array of piezoelectric transducers arranged to concentrate the acoustical energy output therefrom in a plane transverse to said path.

4. A line scan device as defined in claim 1 wherein said liquid body comprises water to which has been added an agent to reduce surface tension and dispersed solid nuclei having diameters of the order of 0.1 micron, to promote cavitation.

5. A line scan apparatus as defined in claim 2 having:

oscillator means connected to said first array of transducers for continuous excitation at an ultrasonic frequency.

6. A line scan apparatus as defined in claim 5 having:

modulator means having a first input connected to said oscillator means for receiving an ultrasonic frequency therefrom, a second input, and an output connected to said second array of transducers; and a pulse generator connected to said second input of said modulator means to cyclically control the ultrasonic frequency at said output and thus cause said second array to be cyclically excited at an ultrasonic frequency.

7. Radiant energy scanning apparatus comprising:

optical means for focusing image rays emanating from a radiant source along a line element;

a confined body of liquid, transparent to said image rays comprising said line element over a continuous portion thereof;

first transducer means located at one end of said continuous portion for continuously propagating ultrasonic energy along the length of said continuous portion, said level of ultrasonic energy being below the level required to induce cavitation in said liquid;

second transducer means located at the opposite end of said continuous body portion for cyclically propagating a burst of ultrasonic energy into said liquid in a direction towards said first transducer means; and photoelectric means responsive to image rays passing through said continuous portion, the level of the ultrasonic energy propagated by said first and second transducer means being additive within said liquid body at the location of the meeting point of the two energy wave fronts to produce cavitation therein.

References Cited by the Examiner

UNITED STATES PATENTS

| | | | |
|---|---|---|---|
| 2,943,315 | 6/1960 | Rosenthal | 88—61 |

DAVID G. REDINBAUGH, *Primary Examiner.*

J. A. ORSINO, *Assistant Examiner.*

Disclaimer 3,306,977.—*Harry P. Brueggemann*, San Marino, Calif. LINE SCAN DEVICE UTILIZING CAVITATION PHENOMENA PRODUCED IN AN ULTRASONIC CELL. Patent dated Feb. 28, 1967. Disclaimer filed June 2, 1967, by the assignee, *The Marquardt Corporation.*

Hereby enters this disclaimer to claims 1 through 6 of said patent.

[*Official Gazette August 29, 1967.*]